United States Patent
Sharpe (10) Patent No.: US 11,370,580 B2
(45) Date of Patent: Jun. 28, 2022

(54) COFFEE AND LIQUID CONTAINER WITH CONCEALED MINI-CUP COMPARTMENT

(71) Applicant: Brian Sharpe, Miami, FL (US)

(72) Inventor: Brian Sharpe, Miami, FL (US)

(*) Notice: Subject to any disclaimer, the term of this patent is extended or adjusted under 35 U.S.C. 154(b) by 401 days.

(21) Appl. No.: 16/668,024

(22) Filed: Oct. 30, 2019

(65) Prior Publication Data

US 2021/0130041 A1    May 6, 2021

(51) Int. Cl.
| | |
|---|---|
| B65D 23/12 | (2006.01) |
| A47J 41/00 | (2006.01) |
| A47G 19/12 | (2006.01) |
| A47G 19/14 | (2006.01) |
| A47G 19/23 | (2006.01) |
| B65D 47/06 | (2006.01) |

(52) U.S. Cl.
CPC .......... B65D 23/12 (2013.01); A47G 19/127 (2013.01); A47G 19/14 (2013.01); A47G 19/23 (2013.01); A47J 41/0027 (2013.01); A47J 41/0088 (2013.01); B65D 47/06 (2013.01); A47G 2019/122 (2013.01)

(58) Field of Classification Search
CPC .... A45C 11/20; B65D 23/12; B65D 21/0233; B65D 21/02; B65D 81/38; B65D 47/06; A47G 19/23; A47G 19/127; A47G 19/12; A47G 19/14; A47J 41/0027; A47J 41/0088
USPC ............ 215/6; 220/23.88, 23.87, 23.83, 703, 220/592.17, 592.09, 625; 206/545, 546, 206/541, 233, 217
See application file for complete search history.

(56) References Cited

U.S. PATENT DOCUMENTS

| | | | |
|---|---|---|---|
| 640,860 A | 1/1900 | Baum, Jr. | |
| 896,903 A | 8/1908 | Ferry | |
| 1,354,712 A | 10/1920 | Altenberg | |
| 3,469,739 A * | 9/1969 | Phillips ................. | A61J 7/0046 206/217 |
| 4,326,638 A | 4/1982 | Nickel et al. | |
| 4,438,856 A | 3/1984 | Chang | |

(Continued)

FOREIGN PATENT DOCUMENTS

KR    20140002943 U  *  5/2014  ............. B65D 77/02

OTHER PUBLICATIONS

Translation of KR20140002943, Choi, May 19, 2014, Figs. 7 and 8 (Year: 2014).*

(Continued)

*Primary Examiner* — Robert J Hicks
(74) *Attorney, Agent, or Firm* — The Concept Law Group, P.A.; Robert C. Kain; Scott D. Smiley (57) ABSTRACT

The coffee mug or drink container has an internal multi-cup compartment. A thermally insulated container (liquid containment store) has a lid with drink spout(s) (if the drink container is not a bottle). The special container has an internal dry store for two or more cups placed in a storage compartment beneath the bottom of the container. Identically shaped cups nest together (stacked) in the dry store on a nested cup support with a complementary surface to limit vertical and horizontal jostling and cup damage. Sometimes the cups are frusto-conically shaped or are matching convex/concaved shaped. An added secondary storage container is included for coffee or drink additives.

7 Claims, 6 Drawing Sheets

(56) References Cited

U.S. PATENT DOCUMENTS

| | | | |
|---|---|---|---|
| 5,301,833 A * | 4/1994 | Aycan | A47F 1/085 206/217 |
| 11,214,399 B1 * | 1/2022 | Hoppe | B65D 47/065 |
| 2008/0011710 A1 | 1/2008 | Cohn | |
| 2009/0107859 A1 * | 4/2009 | Cai | B65D 21/0237 206/217 |
| 2010/0072159 A1 | 3/2010 | Yang | |
| 2010/0084362 A1 | 4/2010 | Letchinger et al. | |
| 2014/0360966 A1 | 12/2014 | Howard | |
| 2015/0158657 A1 | 6/2015 | Olson et al. | |
| 2016/0030898 A1 | 2/2016 | Devoy et al. | |
| 2017/0341849 A1 | 11/2017 | Wolak et al. | |
| 2019/0133358 A1 | 5/2019 | Clyde et al. | |

OTHER PUBLICATIONS

Jetline—20 oz Water Bottle With Detachable Cup, https://primeline.com/20-oz-water-bottle-w-detachable-cup.html (1 pg.), Oct. 2019.
H2Joe—Two-in-One Coffee & Water Bottle by H2Joe https://www.kickstarter.com/projects/h2joe/h2joe (26 pgs.), Oct. 2019.
24 oz. Igloo Swift Silocone Straw Water Bottles, Oct. 2019.
Be part of our #SIGGLOOK, Oct. 2019.
Water Bottle with Integrated Sharing Cup, Oct. 2019.
Klean Kanteen—Insulated TKPro: plastic-free thermal Kanteen with pour-through cap and cup, Oct. 2019.

* cited by examiner

COFFEE AND LIQUID CONTAINER WITH CONCEALED MINI-CUP COMPARTMENT

The present invention relates to a coffee and liquid container or bottle with a concealed mini-cup compartment.

BACKGROUND OF THE INVENTION

There is a need for a coffee mug, bottle, or liquid container which carries consumable drinks for liquid to include a small, dry, internal compartment which compartment holds two or more nested and stacked mini-cups. These mini-cups can be used by the consumer to share the liquid held in the liquid containment store.

Some prior art patent disclosures illustrate bottles or containers which have cup-holding containment stores. U.S. Pat. No. 1,354,712 to Altenberg discloses a vacuum insulated bottle having a screw-on cap which attaches to the mouth of the bottle. The cap has an interior chamber within which is disposed a cup. Upon removal of the bottle cap, the cup is withdrawn from an interior chamber of the bottle cap. The cup is maintained in the cap cavity by a friction fit.

US published patent application no. 20190133358 to Clyde discloses a bottle with an internal storage chamber for cups and accessories. Particularly, the bottle has an outer casing which has, at its lower end, a cavity within which is disposed two or more wineglasses and stems. The stems can be removably attached and detached from the wineglasses. The storage compartment is accessed through a removable base.

U.S. Pat. No. 896,903 to Ferry discloses a combined bottle and cup wherein the cup is attached by a friction fit to a lower outboard region of a bottle.

U.S. Pat. No. 4,326,638 to Nickel discloses a combination base cup and bottle. The base cup is attached to a lower outboard end region of a bottle with a snap on, tongue and groove, fitting.

U.S. Pat. No. 4,438,856 to Chang discloses a combination base cup and bottle. The base cup is attached by a friction fit to an outboard bottom region of the bottle. A plurality of cups having interlocking, friction fitted upper edges, can be attached to the bottom of the bottle. An uppermost cup is attached by a tongue and groove fitting to the outboard bottle terminal end region and the remaining cups are stacked onto the upper cup by respective friction fittings.

US published patent application 20100084362 to Letchinger discloses a drinking bottle assembly which, in one of the embodiments (FIG. 6) shows a glass-type drinking apparatus that is threadably attached to the bottom of a bottle container for liquid. The disclosure explains that the liquid container can be much larger than illustrated in FIG. 6.

US patent application publication 20140360966 to Howard discloses a dual compartment container with a lower containment area retaining a solid and an upper containment area for liquid. The lower and upper containment areas are separate.

OBJECTS OF THE INVENTION

It is an object of the invention to provide a capped coffee mug or drink container with an internal dry store which retains two or more mini-cups permitting the user to share the consumable beverage in the liquid containment store.

It is another object of the present invention to provide a secondary storage container adapted to retain coffee or drink additives therein.

It is a further object of the present invention to provide a cup-storage area with a nested cup support which limits vertical and horizontal movement of the two or more stacked mini-cups contained in the internal dry store.

BRIEF DESCRIPTION OF THE DRAWINGS

Further objects and advantages of the present invention can be found in the detailed description of the preferred embodiments of this invention when taken in conjunction with the accompanying drawings.

SUMMARY OF THE INVENTION

The capped coffee mug or drink container (sometimes referred to as a "bottle" herein) with an internal multi-cup compartment, as broadly described, includes a thermally insulated container for a liquid containment store and a removable lid sealingly engaged atop the top edge of the container. As a drink container, the removable lid has one or more closeable drink dispensing spouts. As a bottle, the lid has no spout and the bottle need not be thermally insulated. The drink container has an internal dry store for two or more cups. The internal dry store is formed within a storage compartment which compartment is removably attachable to the bottom of the thermally insulated container. When removed, the mini-cups can be withdrawn from the compartment. The cups have substantially identical exterior cup shapes and liquid-carrying inboard cup shapes such that adjacent cups nest together in a stacked cup formation. The internal dry store of the storage compartment defines a nested cup support having a supporting surface complementary to the inboard cup shape such that the stacked cup formation is vertically and horizontally supported within the internal dry store.

Certain embodiments of the invention include cups with an exterior cup shape which is a substantially frusto-conical or a substantially convex shape. The supporting surface has a complementary support shape compared to the inboard cup shape. The thermally insulated container may have a bottom wall with an outboard bottom wall surface shaped complementary to the exterior cup shape and the nested stacked cup formation in the storage compartment.

In an enhanced system, a secondary storage container is removably attachable to the lower edge region of the thermally insulated container. In one embodiment, the compartment element forming the internal dry store has a lower containment region and the secondary storage container is formed by a removable wall-defining element which is friction fit to the lower containment region of the internal dry store. The secondary storage container retains coffee or drink additives therein, such as dry goods, sweeteners, a flavorings, or a dry cream packets. Of course, small liquid carrying cream containers may also be placed in the secondary storage container if dry goods storage is not needed.

As for the bottle with an internal multi-cup compartment configuration, the bottle has a liquid containment store holding a consumable drink liquid, a top edge and a bottom terminal edge. A removable cap is sealingly engaged atop the top bottle edge. An internal dry store for two or more cups is formed by a storage compartment which compartment is removably attachable to the bottom terminal edge of the bottle. These cups have a substantially identical exterior cup shape and an inboard cup shape such that adjacent cups nest together to form a stacked cup formation. The internal dry store defines a nested cup support having a supporting surface complementary to the inboard cup shape such that the stacked cup formation is vertically and horizontally supported within the internal dry store. The bottle may have other features as described herein in connection with the drink container.

DETAILED DESCRIPTION OF THE EMBODIMENTS OF THE INVENTION

The present invention relates to a coffee and liquid container or bottle with a concealed mini-cup compartment.

Figure 1:
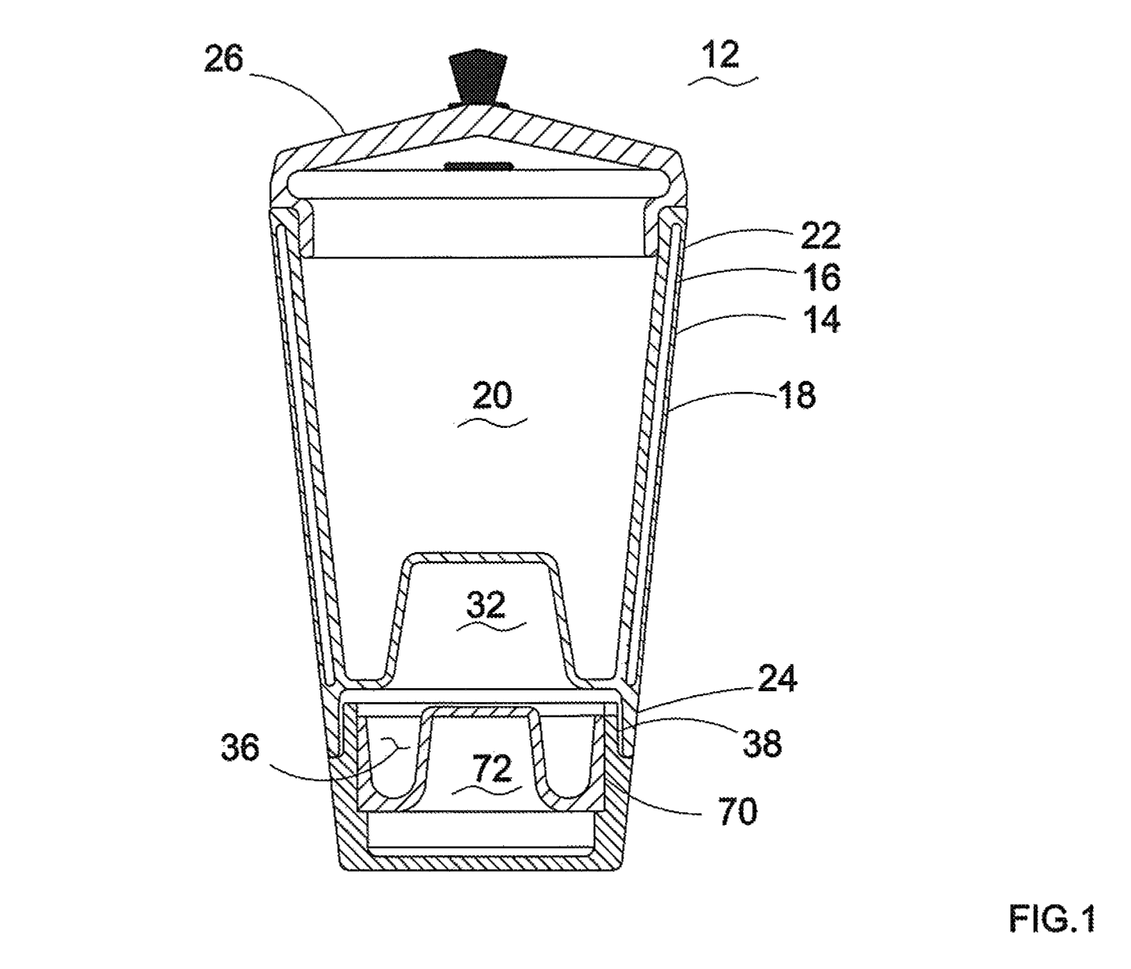
FIG. 1 diagrammatically illustrates the capped coffee mug or drink container in accordance with the principles of the present invention.
Figure 2:
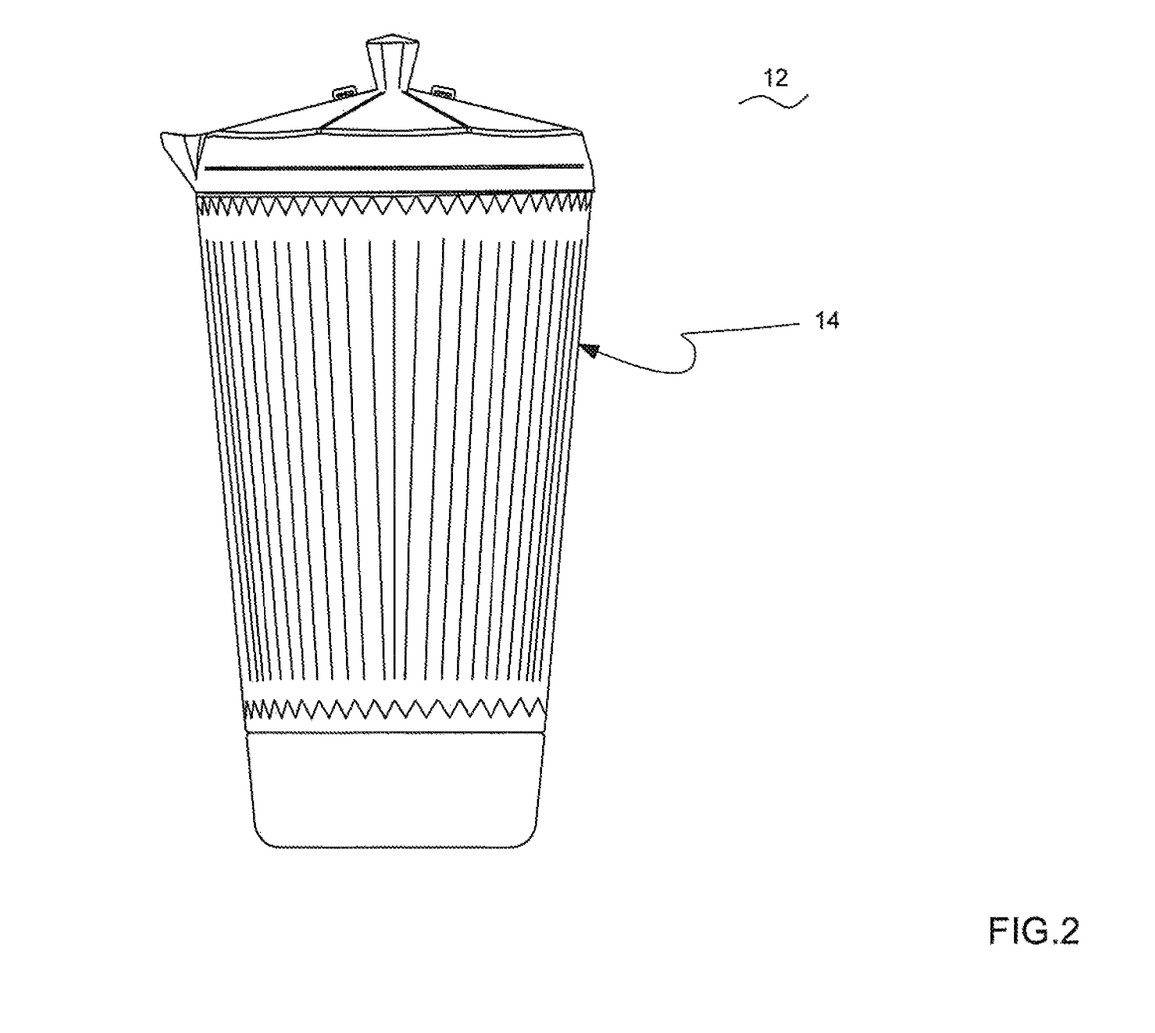
FIG. 2 diagrammatically illustrates that the coffee mug or drink container is a three part system with a first, a second and a third substantially frusto-conical shaped outboard surfaces that forms, when all the compartments are joined together, a resulting structure which is a single, substantially frusto-conically shaped composite drink-holding apparatus.

FIG. 1 diagrammatically illustrates the capped coffee mug or drink container in accordance with the principles of the present invention. A capped coffee mug or drink container 12 has an internal multi-cup compartment. Container 18 has thermal insulation 16 generally embedded in outer wall 14 of container 18. Container 18 defines a liquid containment store 20 which is adopted to hold coffee or a consumable drink. In the illustrated embodiment, insulated container 18 has a top edge region 22 and a bottom edge region 24. A removable lid 26 is sealingly engaged atop the top edge region 22 of the insulated container 18. The removable lid has at least one closable drink dispensing spell is generally shown in FIG. 4.

Figure 4:
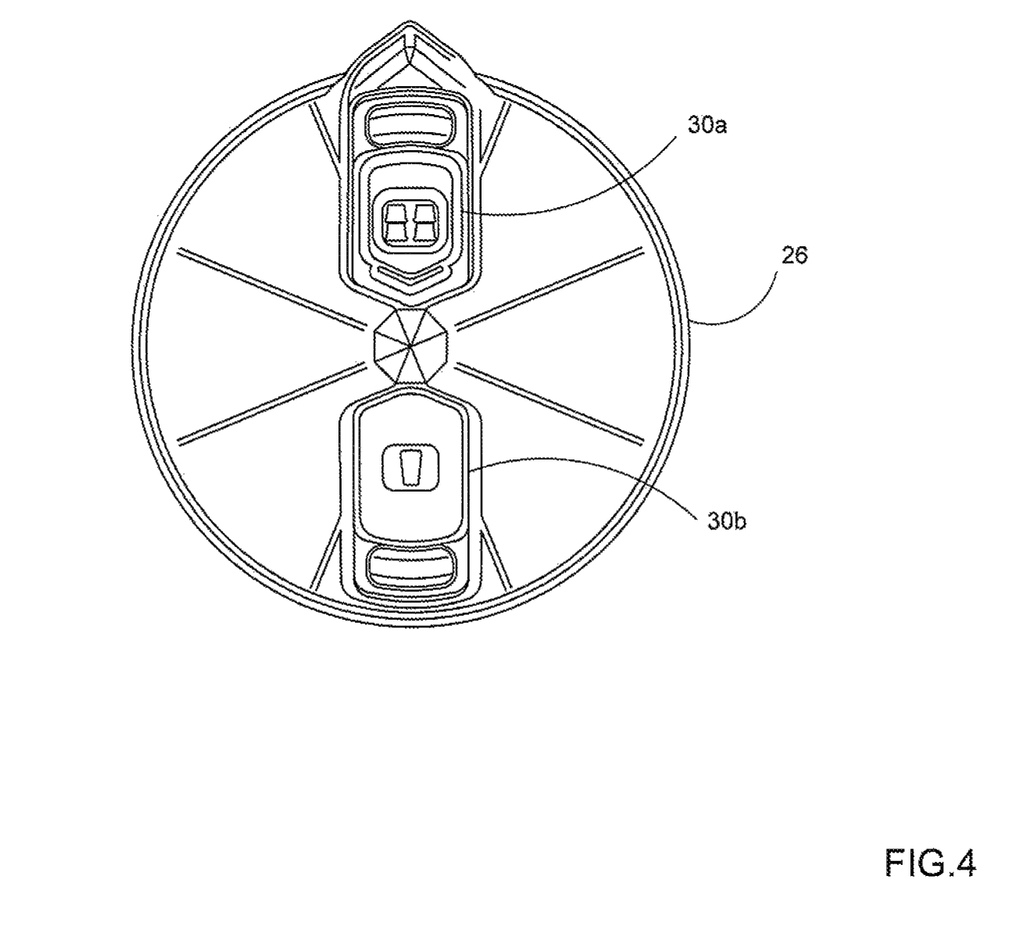
FIG. 4 diagrammatically illustrates the removable lid having first and second drink dispensing spouts.

FIG. 4 diagrammatically illustrates the removable lid having first and second drink dispensing spouts. FIG. 4 shows, in an enhanced embodiment, that the removable lid 26 has a first and a second closable drink dispensing spout 30a, 30b. The type of drinking spout on lid 26 can take any form or structure as associated with other prior art, drink holding containers.

Figure 3A:
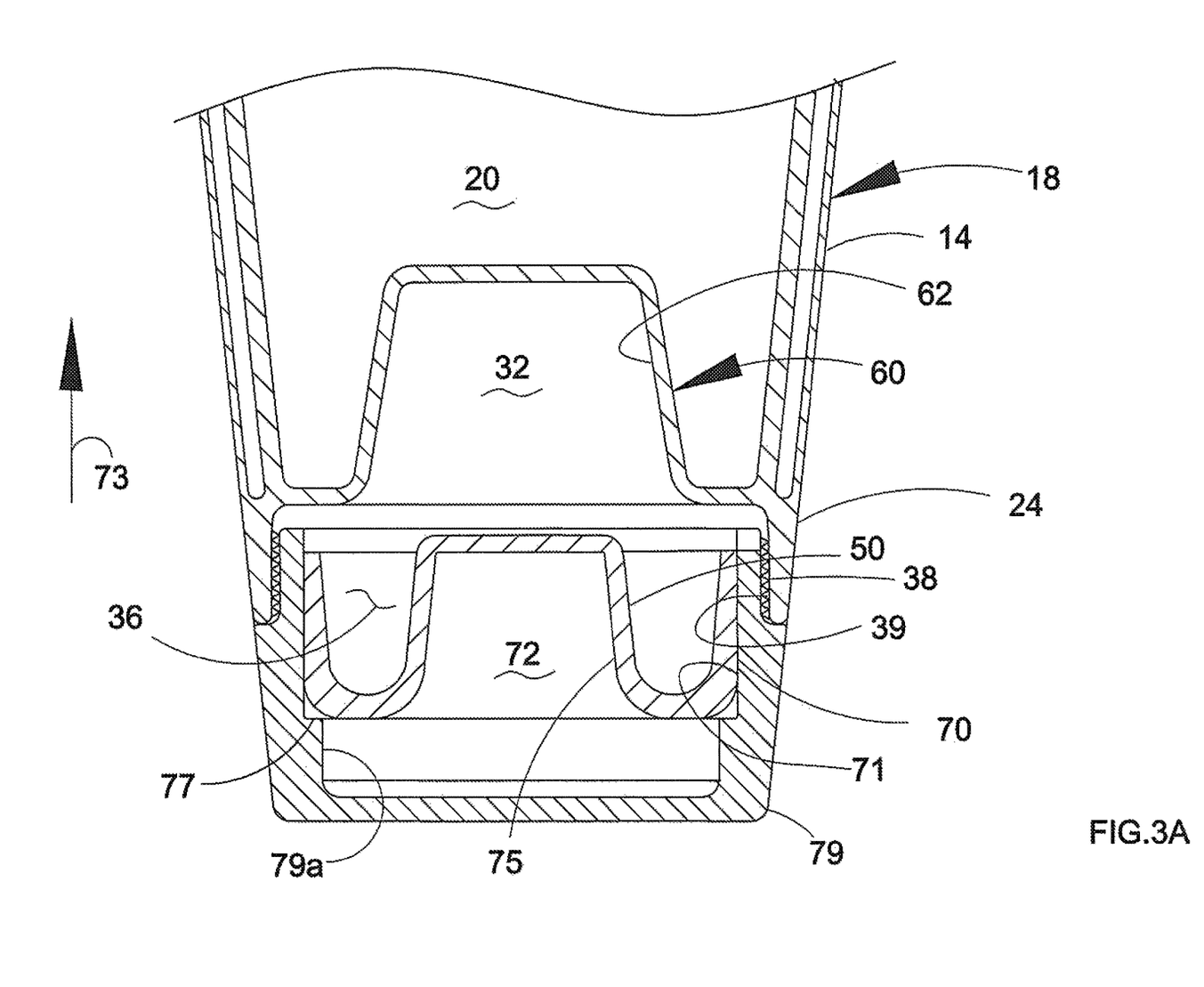
FIGS. 3A and 3B diagrammatically illustrate the internal dry store, the associated mini-cup storage compartment, and, in an enhanced embodiment, the secondary storage container for drink additives.
Figure 3B:
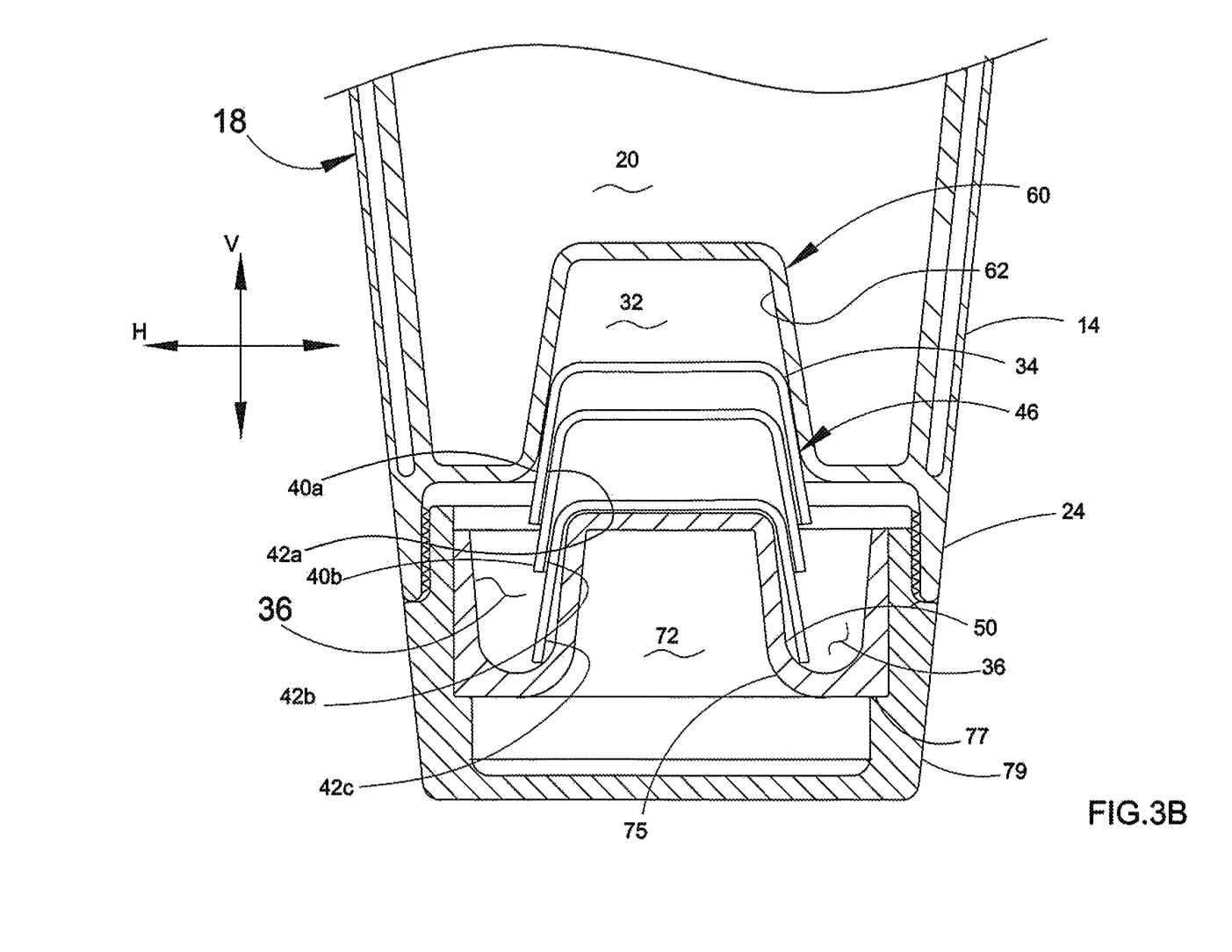

Returning to FIG. 1, drink-holding container 12 includes an internal dry store 32 which, as shown in FIGS. 3A, 3B, retains two or more mini-cups 34 (FIG. 3B). The internal dry store 32 is formed by a storage compartment 36 (element 36) which is removably attachable via an upper compartment ledge 38 (FIG. 3A) to bottom terminal edge region 24 of insulated container 16. In a preferred embodiment, internal dry store 32 is threadably attached to insulated container 16. Other types of attachments, as known to persons of ordinary skill in the art, may be used. In an enhanced embodiment, the drink-holding container 12 further includes a secondary container 72 or containment region 72 which is removably attachable to a lower attachment edge region 70 on storage compartment 36, that is, the compartment defining the mini-cup internal dry store 32. In the illustrated embodiment, lower attachment edge 79 of storage compartment 36 has a friction fit with the illustrated W-shaped element (the W-shape representing a shaped concave surface with, in a preferred embodiment, includes a central frusto-conical support (herein the "W-shaped element")) defining mini-cup supporting surface 50. The W-shaped element having an upward protruding central frusto-conical support and a circumferential upwardly open concave shape.

FIG. 3A shows that the inboard wall forming lower attachment edge 70 of storage compartment 36 engages outboard wall 71 of the W-shaped element 75. The W-shaped element 75 rests on ledge 77 formed on an inboard surface 79a of U-shaped attachment 79 (the U-shape representing a concave surface (herein the "U-shaped attachment" or "U-shaped element")). The U-shaped element 79 generally is shaped as a cup-like element. In a preferred embodiment, U-shaped attachment 79 is threadably attached by interlocking threads at outboard surface 39 of U-shaped attachment 79 and inboard surface 38 of outer wall 14 (of container 18) as diagrammatically illustrated in FIG. 3A. The W-shaped element rests in the U-shaped element by a friction fit between surfaces 70, 71.

FIG. 3B diagrammatically illustrates a portion of insulated container 18 wherein internal dry store 32 defines a nested cup support consisting of a mini-cup supporting surface 50 which is complementary to an inboard cup shape 42c. More precisely, as diagrammatically illustrated in FIG. 3B, the three mini-cups in internal dry store 32 have substantially identical shapes. These cups have substantially identical exterior cup shapes 40a, 40b and substantially identical liquid carrying inboard cup shapes 42a, 42b, 42c. Supporting surface 50 has a complementary shape to retain the nested cups 46 wherein because outboard surface 50 (of W-shaped element 75) closely follows, holds and retains inboard cup shape 42c such that the nested cup formation 46 is vertically and horizontally supported (see vertical arrow V and horizontal arrow H) within internal dry store 32. In this manner, with the stacked and nested cup formation 46 resting between cup support surface 50 and a complementary shaped bottom outer wall surface 62 (of bottom wall 60 of insulated container 18), nested and stacked cup formation 46 is relatively stabilized both in a horizontal H direction and a vertical V direction within internal dry store 32.

The specially configured internal dry store 32 assures that the stacked mini-cups 46 do not, in general, break or deteriorate as the mug or drink container 12 is jostled or shaken laterally (in a horizontal H direction) or vertically (in a V direction). This is especially true for glass mini-cups or shot glasses.

Additionally, there may be cushions for the stacked mini-cups 46 placed in the internal dry store 32 to soften any vertical or horizontal impacts of the mini-cups on the bottom wall 60 of container 18 or the nested cup support surface 50, both of which define the internal dry store 32 space.

As shown in FIG. 3B, and in one embodiment, the mini-cups are frusto-conically shaped. These mini-cups may also have a concave liquid carrying surface and a convex outer cup wall surface. With these types of concave-type cups, nesting support wall 50 would have a complementary convex shape and bottom wall 60, and particularly outboard surface 62, would have a complementary concave shape to limit horizontal and vertical shaking and jostling and the resulting adverse impact forces on the captured mini-cups.

Although not illustrated, bottom wall 60 of insulated container 18 may be insulated or may not be insulated.

Returning to FIG. 3A, a secondary storage container 72 is formed beneath W-shaped element 75. This secondary storage container 72 is adapted to retain drink or coffee additives therein. These additives could be a sweetener, a flavoring, or a dry cream. In order to access secondary storage container 72, the user would, in the preferred embodiment, unscrew lower U-shaped attachment/element 79 (using interlocking threads 38, 39, and withdrawing lower U-shaped element 79 from insulated container 18)(the U-shaped element being a concave shape as noted above). The user would then lift W-shaped element 75 in the direction shown by arrow 73 in FIG. 3A thereby exposing the interior of the second storage container 72. The W-shaped element 75 is set in a friction fit with the U-shaped lower element 79. The U-shaped lower element 79 is threaded onto the container 18. In the illustrated embodiment, the bottom wall 60 of container 18 has an outer wall surface 62 formed as an inverted (downwardly open) frusto-conical shape. The nesting support 50 has a frusto-conical shape (upwardly protruding). Both support 50 and outer wall surface 62 have complementary shapes compared to the nested cups 46 (FIG. 3B) and the cups fit therebetween.

Figure 5:
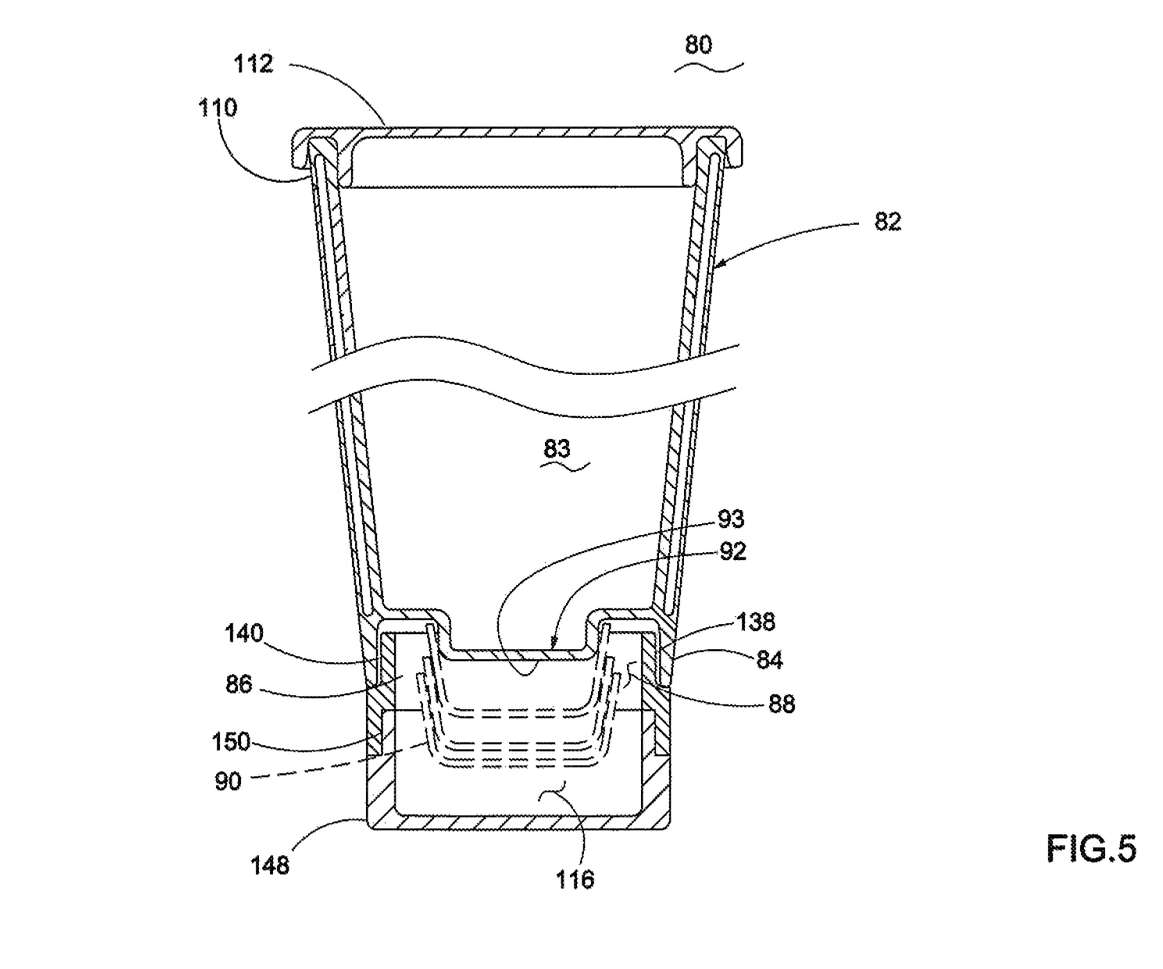
FIG. 5 diagrammatically illustrates two different embodiments of the invention, one embodiment (shown in the upper portion of the drawing) illustrates a bottle with an internal multicup compartment (the bottle may have various shapes other than the frusto-concial illustrated shape) and the other embodiment (shown in the lower portion of the drawing) illustrates the nested cup support created by a protruding element of the outboard bottom wall surface of the liquid carrying container.

FIG. 5 is diagrammatically illustrates two different embodiments of the invention, one embodiment (the upper illustration) being a bottle with an internal multi-cup compartment and the other embodiment (the bottom illustration) being a nested cup support created by the outboard (downward protruding) bottom wall surface of the liquid carrying container. FIG. 5 shows a coffee mug, drink container or bottle 80. It should be noted that the removable lid with a dispensing spout shown in FIG. 4 may be used atop the mug or drink container 80. Alternately, if drink container 80 in FIG. 5 were configured as a bottle, the liquid containment store 83 and the associated bottle 80 has a top edge 110 and a bottom terminal edge 84. Removable lid 112 sealingly engages the top edge 110 of bottle 80.

The other, lower embodiment shown in FIG. 5 shows that the nested cup support surface 93 has a substantially convex or frustoconical shape which substantially complements the inboard liquid carrying surfaces of the nested mini-cups 90. In this sense, internal dry store 88 is formed by storage compartment 86 which dry store compartment is removably attachable to the bottom terminal edge region 84 of the mug/drink container/bottle 80. The nested cup support surface 93 is formed by the bottom wall 92 of the container 82. In the illustrated embodiment of FIG. 5, a substantially U-shaped element 138 is threadably attached at intersecting surfaces 140 at the lower or bottom terminal end 84 of container 82 forming dry storage space 116, 88, 86. A supplemental U-shaped element 148 (which is a concave structure as described above) is threadably attached to U-shaped element 138 (also a concave structure) at intersecting surfaces 150. Structure 148 may be friction fit to the container 80. Structure 148 may be friction fit to structure 138. Also, in all the embodiments, rather than threaded joints, clip-on or tongue and groove attachments may be utilized.

An example of the coffee mug or drink container in FIG. 1 is a coffee container or a colada cup coffee mug. The colada coffee is typically enjoyed by Cubans and others in South Florida. The coffee container includes (a) a stainless mug body, dual wall for insulation and heat retention; (b) an outside of mug body painted white; (c) a containment body formed with ribs to match cafecito cup style (a cafecito is a small coffee cup about the size of a shot glass again enjoyed by Cubans and others); (d) all plastic parts of the container are made from food grade plastic; (e) the mug base is the internal storage compartment which is removeable for storage of sugar and cafecito cups; (f) the base includes sugar lid inside to seal sugar; (g) the mug lid includes pour spout and sip feature; (h) a slide lock feature on one of the spouts seals lid openings when not in use; (i) the lid top is faceted to replicate moka style coffee maker; (j) the lid has integrated knob on top to replicate moka style coffee maker; (k) for branding, a website label is embossed on cup base; and (l) a logo is pad printed on cup body.

Typically, the mug has a 12 fluid ounce capacity and the entire container is about 6-7 inches high and about 3-4 inches at its largest diameter.

An example of a bottle-type embodiment follows. The bottle is shaped to give the appearance of a liquor bottle. The removable base (the internal storage compartment) opens to allow storage of 4 stainless steel (or similar, such as glass or plastic) stack-able cups. The internal walls of the internal storage compartment conforms to the shape of the cups. The cups can be stored rightside up (FIG. 1) or upside down (FIG. 5, lower illustration). The internal storage compartment material may vary depending on intended use because certain liquors are not stored in certain materials. The mouth of the bottle can be environmentally friendly. One embodiment may have a second screw top with a wider mouth (lower down the bottle) or simply having a single wider mouth opening. The secondary storage space in the base of the container may have an area for storage for salt (margaritas), sugar (coffee), or anything else based on the contents.

The claims appended hereto are meant to cover modifications and changes within the scope and spirit of the present invention. Various features of the invention can be combined with other components shown in the drawings to achieve the desired liquid carrying container with an internal chamber with holds mini-cups on a nesting surface, limiting adverse horizontal and vertical forces which may destroy or break the stored mini-cups.

What is claimed is:

1. A capped coffee mug or drink container with an internal multi-cup compartment comprising:

a thermally insulated container defining a liquid containment store adapted to hold coffee or a consumable drink therein, said insulated container having a top edge region and a bottom terminal edge region;

a removable lid sealingly engaged atop said insulated container on said top edge region, said removable lid having at least one closeable drink dispensing spout;

a storage compartment removably attachable to said bottom terminal edge region of said insulated container, said storage compartment defining an internal dry store for two or more cups;

said two or more cups each having a substantially frustoconical exterior cup shape and a liquid-carrying inboard cup shape such that adjacent cups nest together forming a nested inboard cup shape in a stacked cup formation;

said internal dry store having a nested cup support with a supporting surface complementary to said nested inboard cup shape such that said stacked cup formation is vertically and horizontally supported within said internal dry store;

said storage compartment having a lower attachment border; and a secondary storage container removably attachable to said lower attachment border, said secondary storage container sealingly attached to said storage compartment and adapted to retain coffee or drink additives therein.

2. The coffee mug or drink container as claimed in claim 1 wherein said thermally insulated container has an exterior container wall formed as a first substantially frusto-conical shape, said storage compartment has an exterior compartment wall formed as a second substantially frustoconical shape, and said secondary storage container has exterior storage container wall formed as a third substantially frusto-conical shape;

wherein when said secondary storage container is attached to said storage compartment and said storage compartment is attached to said thermally insulated container, a resulting structure forms a single substantially frusto-conically shaped composite.

3. The coffee mug or drink container as claimed in claim 1 wherein said thermally insulated container has a bottom wall for said liquid containment store, said bottom wall having an outboard bottom wall surface which forms said supporting wall for said nested stacked cup formation in said storage compartment.

4. The coffee mug or drink container as claimed in claim 1 wherein said removable lid has a first and a second closeable drink dispensing spout.

5. The coffee mug or drink container as claimed in claim 1 wherein said secondary storage container forms a dry goods containment area and said dry goods containment area is adapted to store coffee or drink additives therein, said dry goods consisting of a sweetener, a flavoring, or a dry cream.

6. A bottle with an internal multi-cup compartment comprising:

a bottle having a liquid containment store adapted to hold a consumable drink liquid therein, said bottle having a top edge and a bottom terminal edge region;

a removable cap sealingly engaged atop said top edge;

an internal dry store for two or more cups formed by a storage compartment removably attachable to said bottom terminal edge region;

said two or more cups each having an identical exterior cup shape and a liquid-carrying inboard cup shape such that adjacent cups nest with a respective exterior cup shape positioned adjacent a corresponding inboard cup shape in a stacked cup formation; and said internal dry store defining a nested cup support having a supporting surface complementary to said inboard cup shape such that said stacked cup formation is vertically and horizontally supported within said internal dry store.

7. The bottle as claimed in claim 6 wherein said exterior cup shape is a substantially frustoconical shape or a substantially convex shape; said inboard cup shape has a complementary inboard cup shape to said exterior cup shape; and wherein said supporting surface has a complementary support shape to said complementary inboard cup shape.

* * * * *